(12) United States Patent
Huang et al.

(10) Patent No.: US 11,498,769 B2
(45) Date of Patent: Nov. 15, 2022

(54) HORIZONTAL ROTARY FOLDING ARM CONVEYOR

(71) Applicant: Changsha University of Science and Technology, Hunan (CN)

(72) Inventors: Juan Huang, Hunan (CN); Lairong Yin, Hunan (CN); Tao Ling, Hunan (CN); Le Xiao, Hunan (CN); Jinxing Wang, Hunan (CN); Yuyang Peng, Hunan (CN); Peng Xu, Hunan (CN); Minhui Chen, Hunan (CN)

(73) Assignee: Changsha University of Science and Technology, Changsha (CN)

( * ) Notice: Subject to any disclaimer, the term of this patent is extended or adjusted under 35 U.S.C. 154(b) by 0 days.

(21) Appl. No.: 17/761,977

(22) PCT Filed: Nov. 19, 2019

(86) PCT No.: PCT/CN2019/119363
§ 371 (c)(1),
(2) Date: Mar. 18, 2022

(87) PCT Pub. No.: WO2021/072896
PCT Pub. Date: Apr. 22, 2021

(65) Prior Publication Data
US 2022/0324652 A1    Oct. 13, 2022

(30) Foreign Application Priority Data

Oct. 16, 2019   (CN) .......................... 201910983566.3

(51) Int. Cl.
*B65G 41/00*    (2006.01)
*B65G 63/00*    (2006.01)
(Continued)

(52) U.S. Cl.
CPC ......... *B65G 41/002* (2013.01); *B65G 63/047* (2013.01); *B65G 2201/045* (2013.01)

(58) Field of Classification Search
CPC .... B65G 41/00; B65G 41/002; B65G 41/005; B65G 63/047; B65G 2201/045
(Continued)

(56) References Cited

U.S. PATENT DOCUMENTS

| 3,392,818 A | * | 7/1968 | Baschant | B65G 67/00 414/141.4 |
| 3,789,997 A | * | 2/1974 | Kozlovsky | B66C 23/26 414/560 |

(Continued)

FOREIGN PATENT DOCUMENTS

| CN | 101920914 A | 12/2010 |
| CN | 105293316 A | 2/2016 |
| CN | 207699078 U | 8/2018 |

OTHER PUBLICATIONS

International Search Report of PCT/CN2019/119363.
Written Opinion of PCT/CN2019/119363.

*Primary Examiner* — Douglas A Hess
(74) *Attorney, Agent, or Firm* — Dragon Sun Law Firm, PC; Jinggao Li; Nathaniel Perkins (57) ABSTRACT

The invention employs a folding arm conveyor that rotates horizontally. The folding arm conveyor is mainly composed of an undercarriage mounted on the ground of a stockyard, a tower body mounted on the undercarriage, a balance arm,
(Continued)

a conveying arm, a tower top, and other main components, wherein the balance arm, the conveying arm, and the tower top are mounted on the tower body. The conveying arm is provided with two portal frames (I) and (II) and an unloading trolley. The tower body is provided with a gyration apparatus and a hopper. The balance arm is provided with a balance trolley. The folding arm conveyor can rotate horizontally, and the conveying arm can be folded and retraced by controlling the wind rope by the windlass, so that the folding arm conveyor can be prevented from colliding with other devices or buildings during the rotation.

8 Claims, 8 Drawing Sheets

(51) Int. Cl.
  *B66C 23/42* (2006.01)
  *B65G 63/04* (2006.01)

(58) Field of Classification Search
  USPC ...... 414/141.4; 212/195, 225, 233, 317, 348
  See application file for complete search history.

(56) References Cited

U.S. PATENT DOCUMENTS

| | | | | |
|---|---|---|---|---|
| 4,688,688 A | * | 8/1987 | Volakakis | B66C 23/16 |
| | | | | 212/253 |
| 4,990,046 A | * | 2/1991 | Tax | B66C 19/002 |
| | | | | 414/141.4 |
| 5,609,260 A | * | 3/1997 | Liao | B66C 23/26 |
| | | | | 212/279 |
| 5,856,862 A | * | 1/1999 | Kokush | F16M 11/425 |
| | | | | 352/243 |
| 5,951,226 A | * | 9/1999 | Fantuzzi | B66C 19/002 |
| | | | | 212/326 |
| 6,276,541 B1 | * | 8/2001 | Gevaudant | B66C 23/26 |
| | | | | 212/300 |
| 6,652,211 B2 | * | 11/2003 | Takehara | B66C 19/002 |
| | | | | 212/325 |
| 8,070,000 B2 | * | 12/2011 | Botwright | B66C 13/08 |
| | | | | 212/227 |
| 8,118,534 B2 | * | 2/2012 | Amoss | B65G 67/603 |
| | | | | 414/803 |
| 8,671,571 B2 | * | 3/2014 | Ozkul | F24S 40/20 |
| | | | | 29/726 |
| 11,111,114 B2 | * | 9/2021 | Van Der Schuit | F16G 11/12 |
| 2014/0263143 A1 | | 9/2014 | Oliver et al. | |

* cited by examiner

HORIZONTAL ROTARY FOLDING ARM CONVEYOR

CROSS-REFERENCE TO RELATED APPLICATIONS

This application is a national stage application of PCT/CN2019/119363. This application claims priorities from PCT Application No. PCT/CN2019/119363, filed Nov. 19, 2019, and from the Chinese patent application 201910983566.3 filed Oct. 16, 2019, the content of which are incorporated herein in the entirety by reference.

TECHNICAL FIELD

The present invention relates to a folding arm conveyor that rotates horizontally, which belongs to the field of conveyors.

BACKGROUND OF THE PRESENT INVENTION

In the large-scale stockyard, a belt-type conveyor is a preferred type of conveying device. The conveyor can only convey sand and gravel to places along a conveying belt. Therefore, an existing large-scale stockyard still has problems of low utilization rate and low working efficiency of the conveyor. The traditional solution is to use other devices to transfer the sand and gravel, which may inevitably increase the cost and management difficulty.

During the use of the conveyor, there are actually the following problems:

1. In the prior art, a folding conveying arm is used to realize the function of long-distance conveying and storage. However, the folding arm is generally folded in two sections. The folding of three sections is generally assisted by various devices such as a hydraulic cylinder. The complete unfolding cannot be realized by the hydraulic cylinder, and requires other auxiliary structures.

2. The conveyor in the prior art has a single counterweight form and cannot realize multi-level variable counterweight. Especially for large-sized devices, the multi-level variable balancing is more difficult to realize.

3. In the prior art, generally the travel control only adopts one limit part such as a bump, an anti-collision block and the like. However, the limit part is single in structure and cannot realize dynamic travel control. Especially in the conveyor, the folding and unfolding states of the folding arm are caused by the movement of the large-sized device, so that the dynamic travel control is particularly important, which is not solved in the prior art.

4. In the prior art, after the conveying belt and the hopper have conveyed materials, there may be some materials remaining thereon, so that at the moment, it is not appropriate to start the entire system. The prior art lacks a flexible solution.

5. In the prior art, there is no stable connection and a functional connection between an upstream conveyor and a downstream conveyor, resulting in resource waste and low efficiency.

SUMMARY OF THE PRESENT INVENTION

In order to overcome the above problems, the present invention specifically provides a solution of a folding arm conveyor that rotates horizontally.

The technical solution adopted by the present invention that is designed to solve its technical problem is as follows: regarding the folding arm conveyor that rotates horizontally, the folding arm conveyor includes three sections of conveying arms, a tower top (10), a balance arm (17), a tower body (24), an undercarriage (25), a windlass, wire ropes, portal frames and a limit apparatus. The undercarriage (25) is fixedly mounted in a stockyard through foundation bolts, and the tower body (24) is also connected with the undercarriage (25) through bolts; the three sections of conveying arms are respectively a first conveying arm (7), a second conveying arm (4), and a third conveying arm (1).

The first conveying arm (7) is mounted on the tower body (24) through a pin shaft. The second conveying arm (4) is connected to the first conveying arm (7) through a pin shaft. The third conveying arm (1) is connected to the second conveying arm (4) through a pin shaft. The third conveying arm (1) is a trapezoidal structure and this conveying arm is provided with an unloading trolley (9). The portal frame I (5) is mounted on one end of the first conveying arm (7) close to the second conveying arm (4), and the limit apparatus I (6) is also mounted on the first conveying arm. The portal frame II (2) is mounted on one end of the third conveying arm (1) close to the second conveying arm (4), and the limit apparatus II (3) is also mounted on the third conveying arm. The balance arm (17) is mounted on the tower body (24) through a pin shaft; the tower top (10) is connected to the tower body (24) through bolts.

The windlasses include a windlass I (21), a windlass II (20), a windlass III (19), and a windlass IV (18), which are sequentially mounted on the balance arm (17). A wire rope I (11) controlled by the windlass I (21) successively bypasses a pulley block on a top end of the tower top, a pulley block on a top end of the portal frame I (5), a pulley block on a lower portion of the second conveying arm (4); a wire rope II (12) controlled by the windlass II (20) bypasses the pulley block mounted on the tower top (10) and finally bypasses a pulley block located on an upper portion of the second conveying arm (4). A wire rope III (13) controlled by the windlass III (19) successively bypasses the pulley block on a top end (10) of the portal frame II (2), and a pulley block on a side portion of the third conveying arm (1); and the tower body (24) is provided with a gyration apparatus (23) and a hopper (22).

Distances from the pulley block on the lower portion of the second conveying arm to two ends of the second conveying arm are respectively a first distance and a second distance, and the first distance is twice the second distance; and distances from the pulley block on the side portion of the third conveying arm to two ends of the third conveying arm are respectively a third distance and a fourth distance, and the third distance is twice the fourth distance, and the pulley blocks on the upper and lower portions of the second conveying arm are arranged side by side.

The balance arm (17) is provided with a balance trolley (16) and travel switches. The balance trolley is connected with the windlass IV through a wire rope IV; the movement of the balance trolley is controlled by the windlass IV (18) which is automatically controlled based on PLC programming. When the conveying arms are in a folded, unfolded no-load, unfolded medium-load, and an unfolded heavy-load state, the balance trolley moves to the corresponding four positions on the balance arm; the purpose for the trolley to move to different positions is to balance a tilting torque of the conveying arm in different states. The travel switch is mounted on each position, and the travel switches are respectively named as the travel switch I, the travel switch II, the travel switch III, and the travel switch IV from the near to the distant to the tower body.

The limit apparatus is used to limit the position of the portal frame. In addition, the limit apparatus includes a framework (36), a separation plate (32), a lower cavity (33), a supporting block (34), a sliding block (35), and an upper cavity (37). The framework is divided into two parts by the separation plate. The upper and lower cavities are formed by enclosing the separation plate and the framework. The supporting block is arranged on the separation plate to limit and support the portal frame. The sliding block is arranged at the bottom of the framework and can slide in the lower cavity;

The hopper (22) can be inclined relative to the tower body, the unloading trolley (9) is provided with an inclined plate for receiving the materials dropped by the hopper (22), and the inclined plate can assist in making the sand and gravel fall in the unloading trolley (9);

The lower end of the balance arm (17) is provided with a hook for connecting with the upstream equipment, and the weight of the upstream equipment is used as a counterweight.

The balance arm (17) and the conveying arm are respectively mounted at two sides of the tower body (24), and the mounting position of the balance arm (17) is higher than the mounting position of the conveying arm. The balance arm (17) and the conveying arm are connected with a crossbeam located on the top end of the tower top through a balance arm pull rod (14) and a conveying arm pull rod (8), respectively.

One end of the first conveying arm (7) close to the tower body (23) is provided with a driving roller, and the tail end of the third conveying arm (1) is also provided with a driven roller. The first conveying arm (7), the second conveying arm (4), and the third conveying arm (1) are respectively provided with a grooved carrier roller group, a return carrier roller, and a pinch roller. The pinch roller is used to prevent a conveying belt from leaving the carrier roller during the folding and unfolding of the conveying arm. The unloading trolley is mounted on the conveying arm and can move along the conveying arm.

The tower top (10) is successively provided with three pulley blocks from bottom to top, which are respectively used for the wire rope I (11), the wire rope II (12), and the wire rope III (13) to bypass.

The tower body (24) is provided with a gyration apparatus (23). The gyration apparatus can drive the conveying arm and the balance arm (17) to rotate within a horizontal plane.

The second conveying arm (4) and the third conveying arm (1) can be unfolded and retraced by controlling the wind rope by the windlass, wherein the windlass is controlled by a programmable control system which is operated using a hand-held remote controller. Specific operating steps are as follows: a, the arm support is unfolded; the windlass I (21) is started; under the pulling force of the wire rope I (11), the second conveying arm (4) and the third conveying arm (1) may rotate upwards; at the same time, the windlass IV is started, and a balance trolley (16) moves in a direction away from the tower body (24); when the second conveying arm (4) forms an angle of 90 degrees with a horizontal plane, windlass II (20) is started, the wire rope I (11) is released, and two sections of conveying arms slowly rotate downwards under the pulling force of the wire rope II (12); after the second conveying arm (4) rotates downwards for a certain angle, the windlass III (19) is started and the third conveying arm (1) rotates upwards under the traction of the wire rope III (19); when the second conveying arm (4), the third conveying arm (1) and the first conveying arm (7) are located on the same plane, and a front wheel of the balance trolley touches a travel switch II, the balance trolley stops moving, and the conveying arm is completely unfolded; and b, the arm support is retracted by reversing the unfolding operation process of the arm support according to the same principle.

The third conveying arm (1) is provided with a mechanical sensor. When the conveying arms are in a folded, unfolded no-load, unfolded medium-load, and an unfolded heavy-load state, the third conveying arm is subject to forces of different magnitudes. When the sensor on the third conveying arm detects that the force changes from within one range to another range, the windlass IV automatically pulls the balance trolley to move to next position. When the front wheel of the trolley touches the travel switch at the corresponding position, the trolley stops moving.

Preferably, the tower body (24) is provided with the gyration apparatus (23). The gyration apparatus (23) can drive the conveying arm and the balance arm (17) to rotate within a horizontal plane.

Preferably, the third conveying arm (1) is a trapezoidal structure and the conveying arm is provided with an unloading trolley (9) which can move along the conveying arm.

Preferably, one end of the first conveying arm (7) close to the tower body (23) is provided with a driving roller, and the tail end of the third conveying arm (1) is provided with a driven roller.

Preferably, the first conveying arm (7), the second conveying arm (4), and the third conveying arm (1) are respectively provided with a grooved carrier roller group, a return carrier roller, and a pinch roller. The pinch roller is used to prevent a conveying belt from leaving the carrier roller during the folding and unfolding of the conveying arm.

Preferably, the balance arm (17) is provided with the balance trolley (16) and travel switches. The movement of the balance trolley is controlled by the windlass IV (18) which is automatically controlled based on PLC programming.

Preferably, the second conveying arm (4) and the third conveying arm (1) realize unfolding and retraction through wipe ropes controlled by the windlass, wherein the windlass is controlled by a programmable control system.

Preferably, a mechanical sensor is mounted on the third conveying arm (1), which can detect changes in the force to which the conveying arm is subject. Thereby, the balance trolley (16) is pulled to move to different positions.

Preferably, the movements of the gyration apparatus and the unloading trolley (9) are controlled by a programmable control system.

Compared with the prior art, the present invention has the following beneficial effects:

To address the problem of a low utilization rate in the existing stockyard, the present invention integrates simultaneously two functions, rotation and folding, which are novel to a certain extent. Compared with a folding conveyor of same type, the present invention does not use hydraulic cylinders, and controls the movement of the conveying arm through a windlass. This not only streamlines the structure and lowers weight, but also reduces the manufacturing cost. Compared with the rotary belt-type conveyor of same category, the present invention is simple in structure and large-scale devices can be manufactured based on the same invention. Therefore, it is more practical for use in large stockyards. Compared with other traditional stationary belt-type conveyors used in stockyards, the present invention does not require stand columns to support the conveying arms, so it takes up less floor space. Meanwhile, the invention is more flexible in that the sand and gravel can be transported to more places without requiring multiple conveyors or with the assistance of other conveyors. This improves the utilization rate of the stockyard. When using a folding arm conveyor, the conveying arm can be retracted when it is not in use. This ensures great safety as it can be prevented from tilting under the action of winds or colliding with other devices. The invention is controlled by a programmable control system, and has high reliability and does not require human labor.

BRIEF DESCRIPTION OF DRAWINGS

FIG. 1A schematic diagram of a conveying arm in a folded state.

FIG. 2A schematic diagram of the portal frame I that pulls up the second and third conveying arms to a vertical state.

FIG. 3A schematic diagram of the second and third conveying arms unfolded under gravity and a pulling force of cables.

FIG. 4A schematic diagram of the conveying arm when completely unfolded.

FIG. 5A schematic diagram of a conveyor rotating within a horizontal plane.

FIG. 6A schematic diagram of a limit apparatus when limiting the position of the portal frame.

FIG. 7A flow chart of a process for automatically controlling the conveyor in a stockyard.

FIG. 8A schematic diagram of the present invention in a dike-striding conveying and stacking system, wherein the present invention is located at the tail end of the stacking system.

DESCRIPTION OF REFERENCE NUMERALS IN THE DRAWINGS

1—third conveying arm; 2—portal frame II; 3—limit apparatus II; 4—second conveying arm; 5—portal frame I; 6—limit apparatus I; 7—first conveying arm; 8—conveying arm pull rod; 9—unloading trolley; 10—tower top; 11—wire rope I; 12—wire rope II; 13—wire rope III; 14—balance arm pull rod; 15—wire rope IV; 16—balance trolley; 17—balance arm; 18—windlass IV; 19—windlass III; 20—windlass II; 21—windlass I; 22—hopper; 23—gyration apparatus; 24—tower body; 25—undercarriage; 26—sand unloading ship; 27—elevation feeding apparatus; 28—dike striding amplitude changing apparatus; 29—horizontal rotary central folding arm conveyor; 30—stockyard; 31—dike; 32—separation plate; 33—lower cavity; 34—supporting block; 35—sliding block; 36—framework; 37—upper cavity.

DETAILED DESCRIPTION OF THE PRESENT INVENTION

The present invention is further described in conjunction with the drawings and embodiments.

1. For the first problem in the background, based on the fact that the three sections of conveying arms are respectively provided with wire ropes, a solution of multi-point forward-backward traction is used, so that the folding of the three sections is realized only by wire ropes. The multi-point forward-backward traction includes points on the portal frames and points on the lower, upper, and side pulley blocks. In the multi-point traction, the folding and unfolding of the three sections can be realized by the forward and backward traction of the multi-point traction, so that the use of the hydraulic cylinder and a complicated cooperation structure can be avoided, thereby greatly reducing the cost.

2. For the second problem in the background, the movable balance trolley is used. Different arm of forces and torques can be obtained by moving the balance trolley to different points, thereby realizing a dynamic balance.

3. For the third problem in the background, the dynamic limit of the portal frames can be realized under the combined action of supporting and sliding blocks, thereby playing a role in dynamically supporting and limiting the wire ropes connected with the portal frames and the conveying arms.

4. For the fourth problem in the background, when there are residual materials, the materials in the hopper can be received by an oblique plate on the unloading trolley, thereby obtaining the residual materials.

5. For the fifth problem in the background, the lower end of the balance arm is provided with the hook which is used for connecting the upstream device and uses the weight of the upstream device as a balance weight.

As shown in the drawings, regarding the folding arm conveyor that rotates horizontally, the folding arm conveyor includes three sections of conveying arms, a tower top (10), a balance arm (17), a tower body (24), an undercarriage (25), a windlass, wire ropes, portal frames and a limit apparatus. The undercarriage (25) is fixedly mounted in a stockyard through foundation bolts, and the tower body (24) is also connected with the undercarriage (25) through bolts. The three sections of conveying arms are respectively a first conveying arm (7), a second conveying arm (4), and a third conveying arm (1). The first conveying arm (7) is mounted on the tower body (24) through a pin shaft. The second conveying arm (4) is connected to the first conveying arm (7) through a pin shaft. The third conveying arm (1) is connected to the second conveying arm (4) through a pin shaft. The third conveying arm (1) is a trapezoidal structure and the conveying arm is provided with an unloading trolley (9). The portal frame I (5) is mounted on one end of the first conveying arm (7) close to the second conveying arm (4), and the limit apparatus I (6) is also mounted on the first conveying arm. The portal frame II (2) is mounted on one end of the third conveying arm (1) close to the second conveying arm (4), and the limit apparatus II (3) is also mounted on the third conveying arm. The balance arm (17) is mounted on the tower body (24) through a pin shaft; the tower top (10) is connected to the tower body (24) through bolts; the windlass includes a windlass I (21), a windlass II (20), a windlass III (19), and a windlass IV (18), which are sequentially mounted on the balance arm (17). A wire rope I (11) controlled by the windlass I (21) successively bypasses a pulley block on a top end of the tower top, a pulley block on a top end of the portal frame I (5), and a pulley block on a lower portion of the second conveying arm (4). A wire rope II (20) controlled by the windlass II (12) bypasses the pulley block mounted on the tower top (10) and finally bypasses a pulley block located on an upper portion of the second conveying arm (4). A wire rope III (13) controlled by the windlass III (19) successively bypasses the pulley block on a top end of the tower top (10), the pulley block on a top end of the portal frame II (2), and a pulley block on a side portion of the third conveying arm (1); and the tower body (24) is provided with a gyration apparatus (23) and a hopper (22);

As shown in the drawings, the specific unfolding steps of an arm support are as follows: a, the arm support is unfolded; the windlass I (21) is started; under the pulling force of the wire rope I (11), the second conveying arm (4) and the third conveying arm (1) may rotate upwards; at the same time, the windlass IV is started, and a balance trolley (16) moves in a direction away from the tower body (24); when the second conveying arm (4) forms an angle of 90 degrees with a horizontal plane, the windlass II (20) is started, the wire rope I (11) is released, so that two sections of conveying arms slowly rotate downwards under the pulling force of wire rope II (12); after the second conveying arm (4) rotates downwards to a certain angle, the windlass III (19) is started and the third conveying arm (1) rotates upwards under the traction of the wire rope III (19); when the second conveying arm (4), the third conveying arm (1) and the first conveying arm (7) are located on the same plane, and a front wheel of the balance trolley touches a travel switch II, the balance trolley stops moving, and the conveying arm is completely unfolded; and b, the arm support is retracted by reversing the unfolding operation process of the arm support according to the same principle.

As shown in the drawings, after a motor for driving the gyration apparatus is started, the gyration apparatus may drive the tower top, the conveying arms and the balance arm to rotate.

As shown in the drawings, the portal frame does not rotate continuously after reaching the limit apparatus. The position of the conveying arm that is h1/tan γ away from the tower body is marked as a position A, and the tail end of the conveying arm is marked as a position B. The movement of the unloading trolley leaving the tower body is marked as the forward movement of the trolley. The movement of the unloading trolley approaching the tower body is marked as the backward movement of the trolley, and n represents the times it rotates by 15°. The gyration apparatus and the unloading trolley are automatically controlled after the programming. If a driving roller is stopped midway, the gyration apparatus and the unloading trolley are automatically returned.

Figure 1:
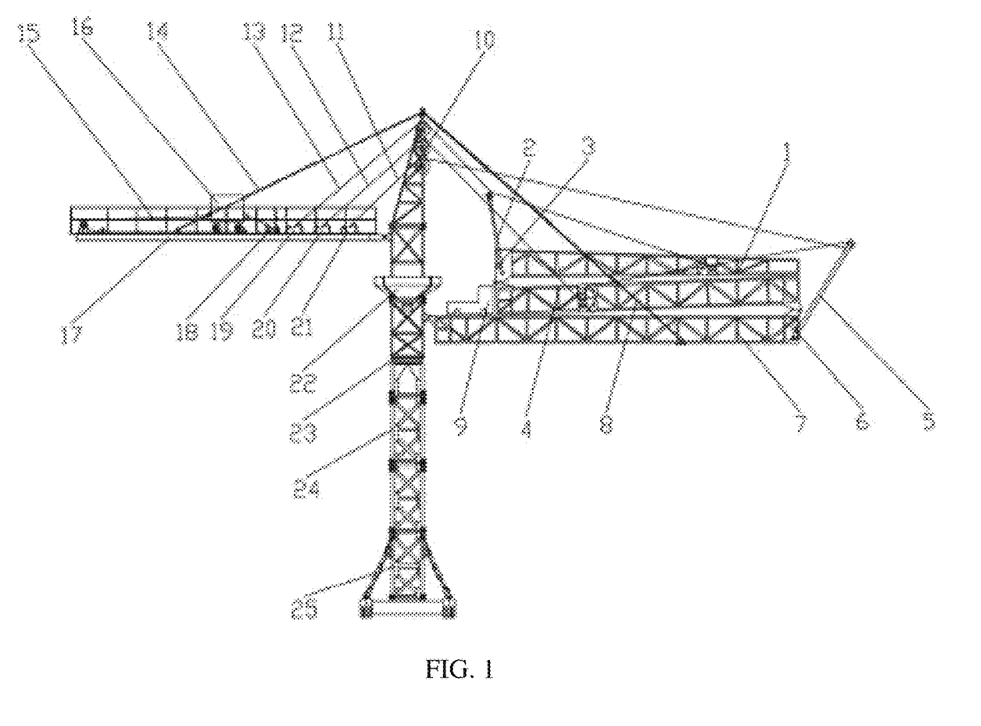
Figure 2:
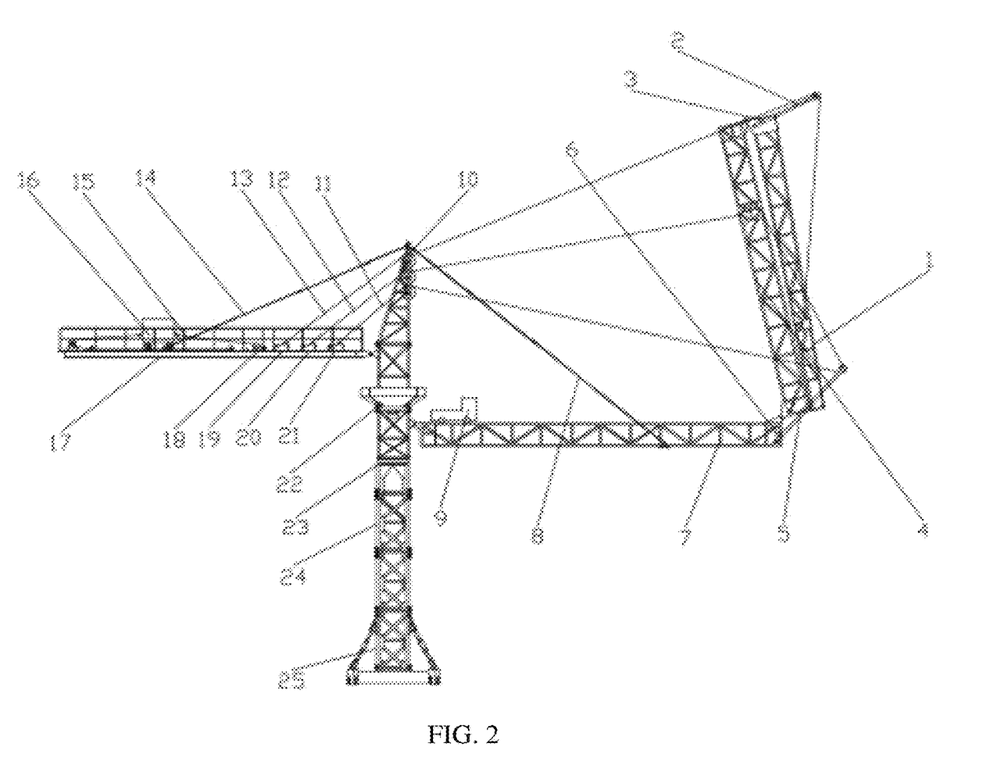
Figure 3:
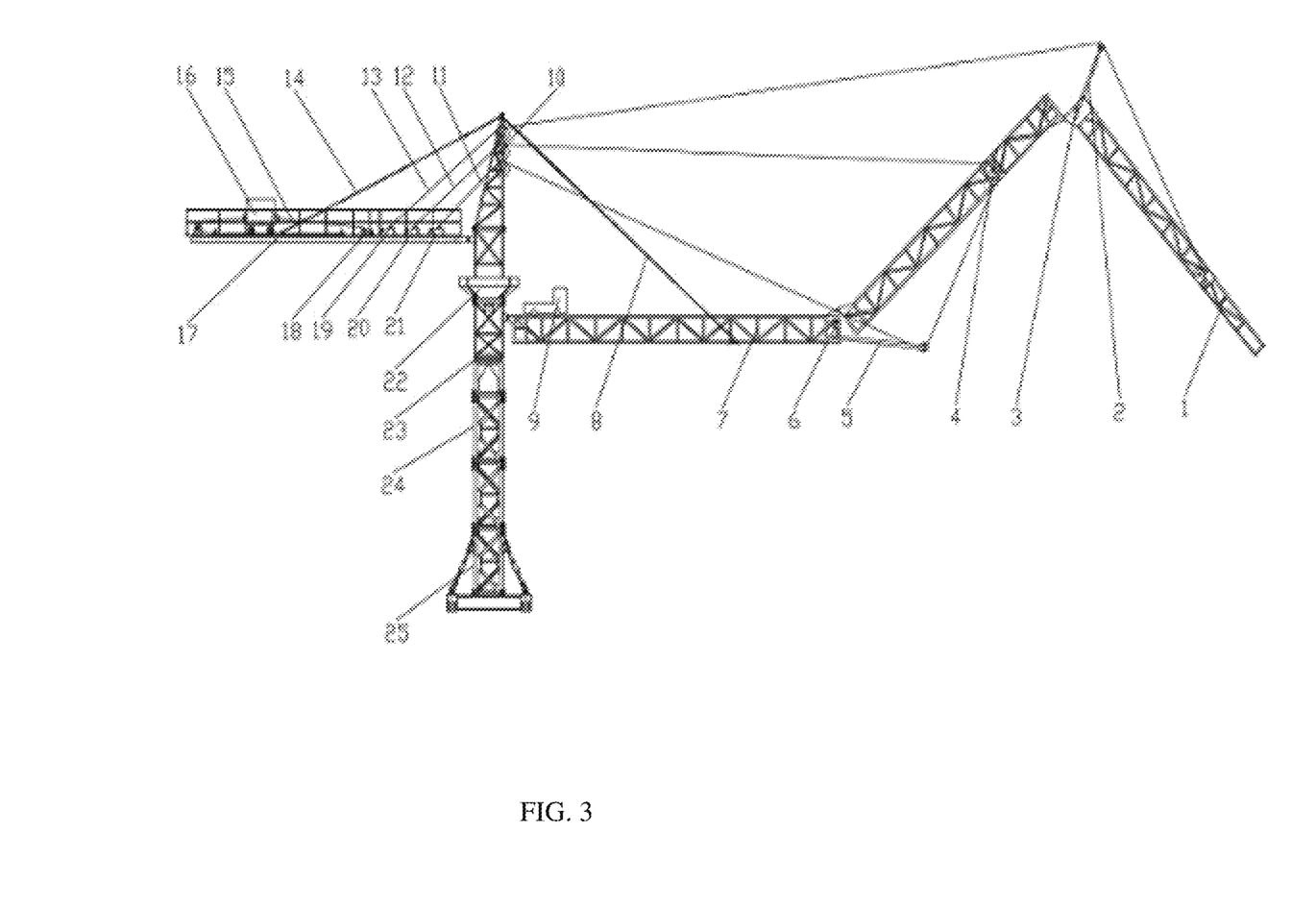
Figure 4:
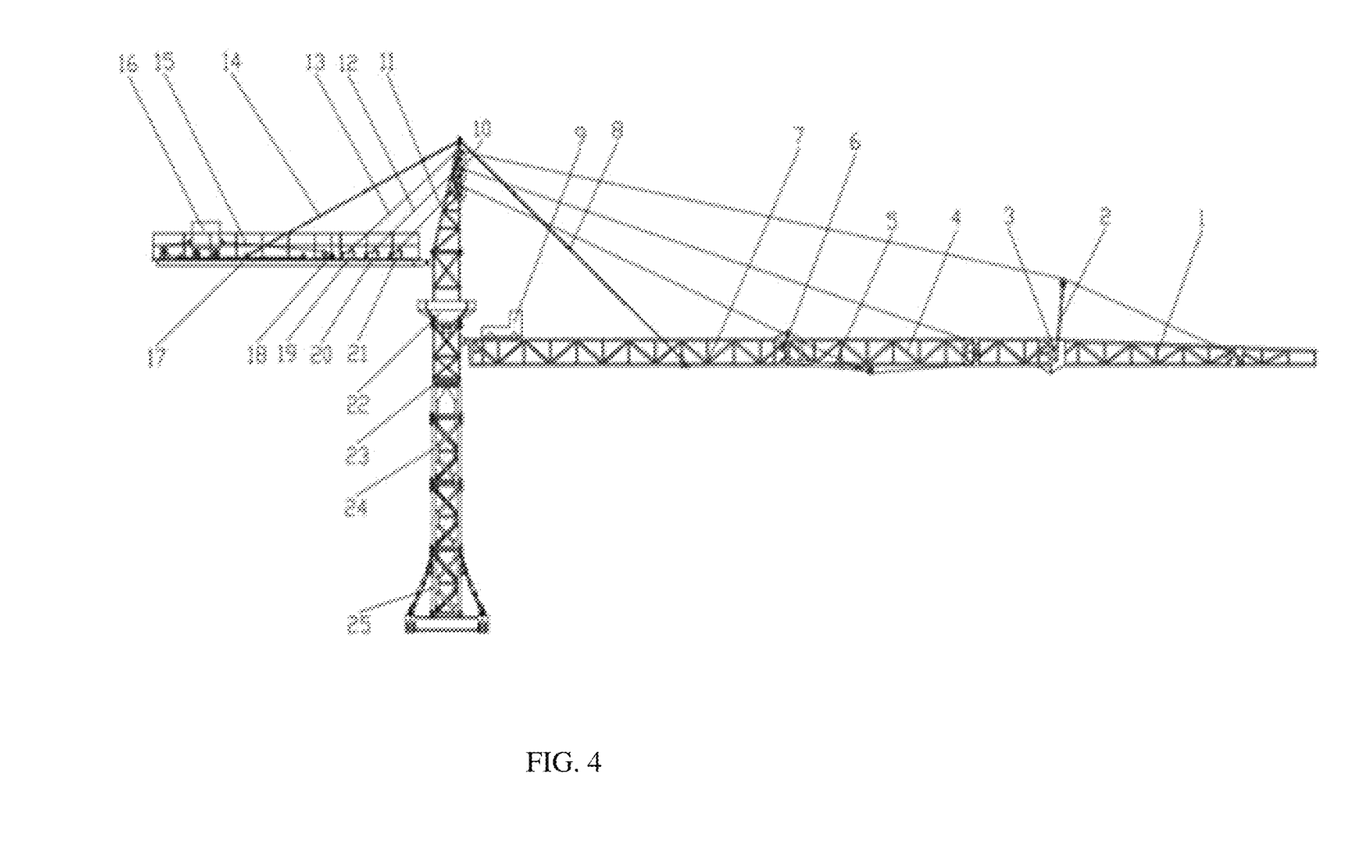
Figure 5:
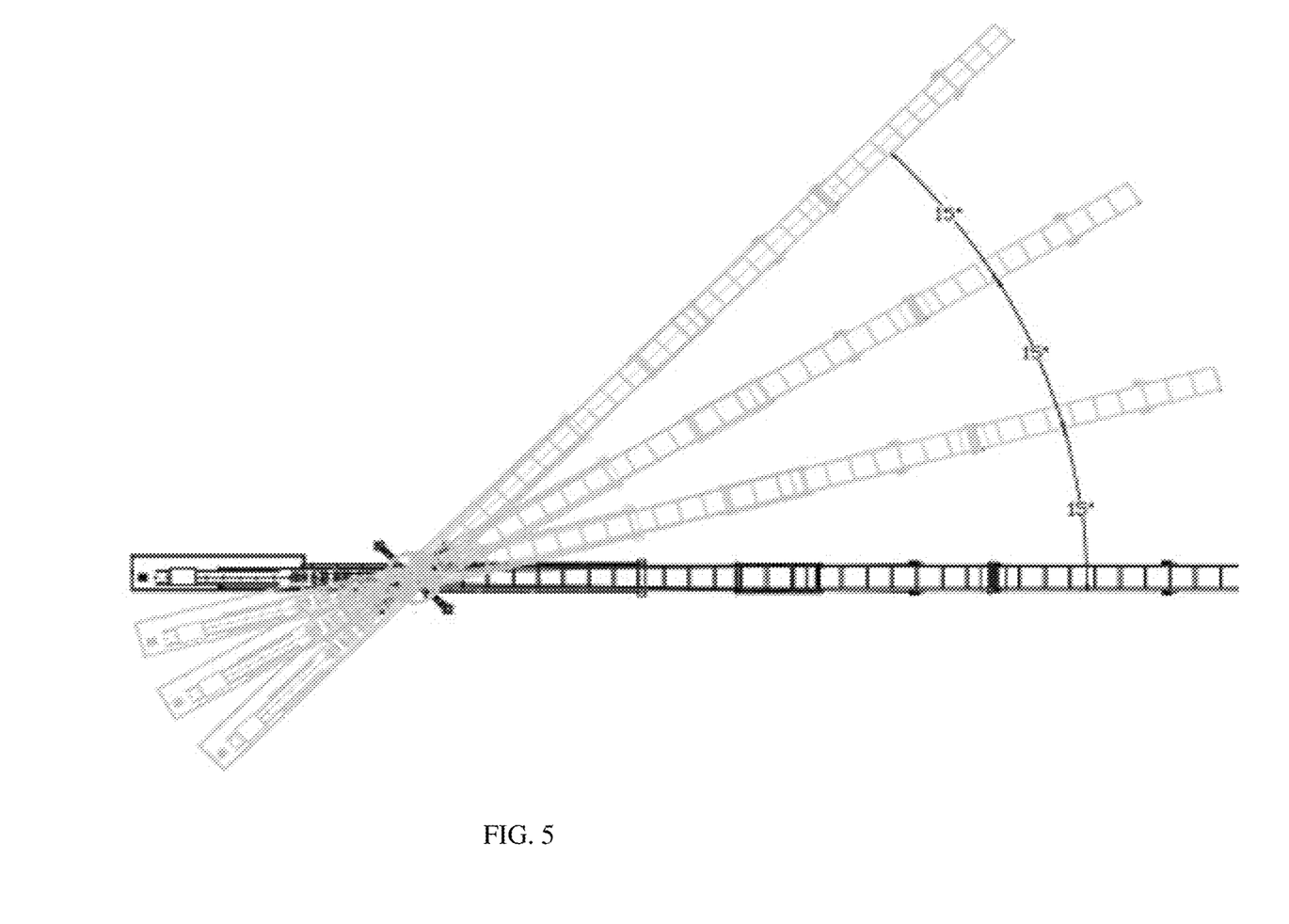
Figure 6:
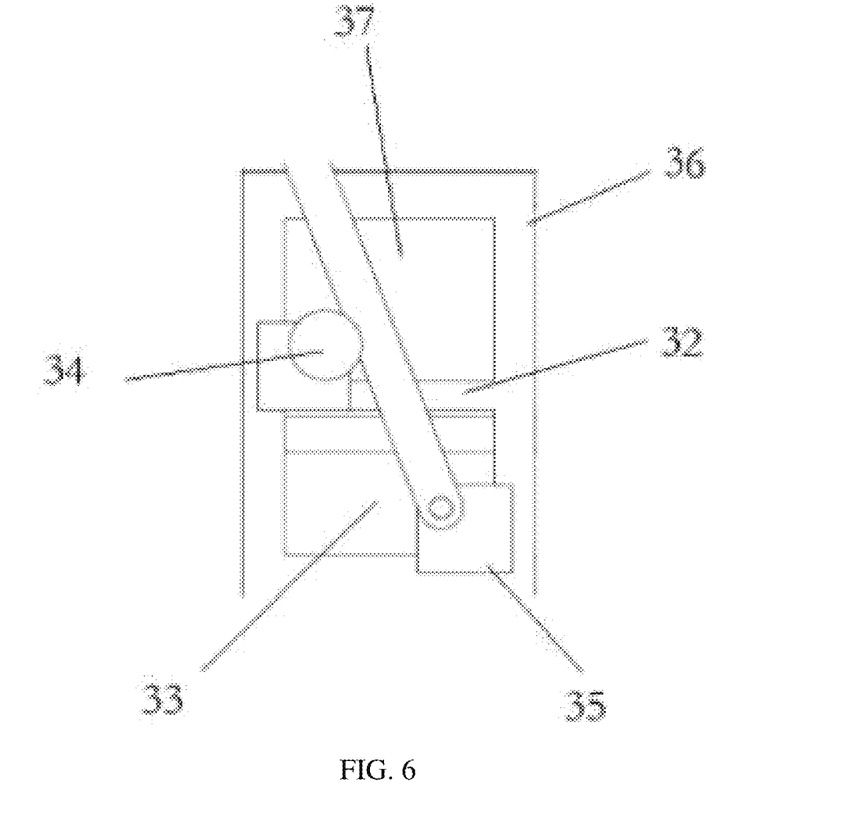
Figure 7:
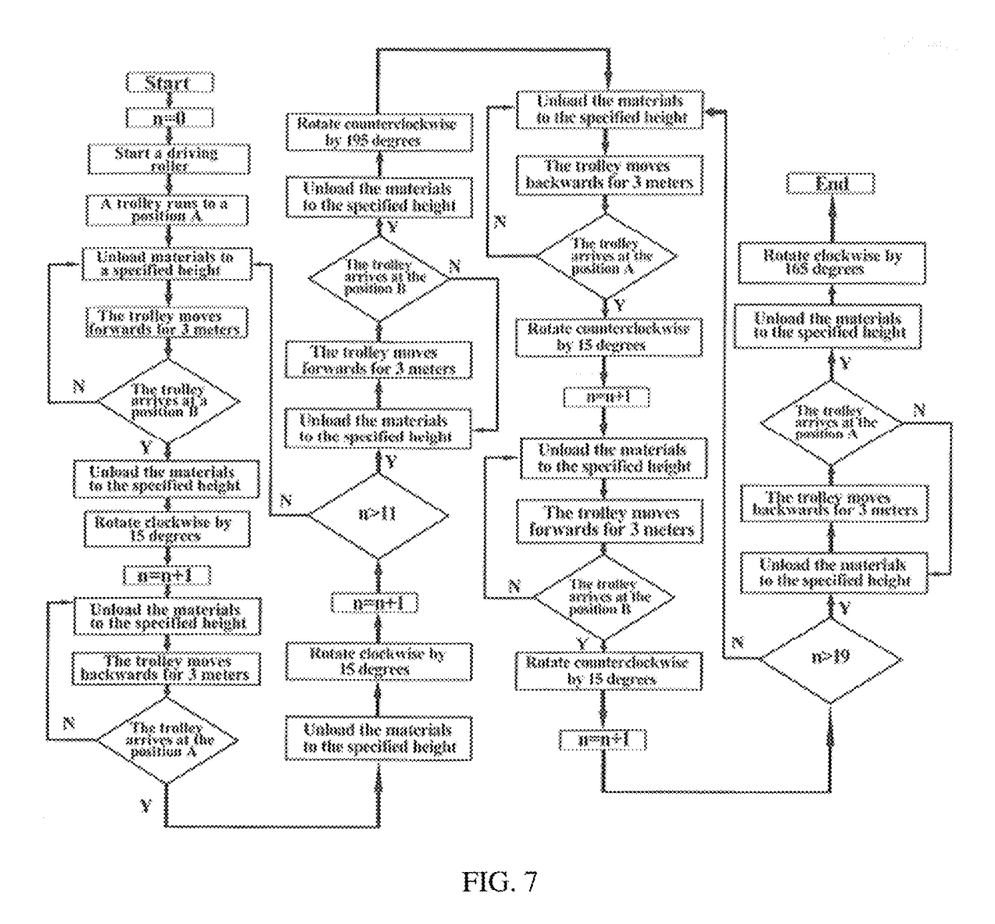

The movement of the gyration apparatus and the unloading trolley (9) is controlled by a programmable control system. Assuming that a stacking angle of sand and gravel is γ, a height of the conveying arm from the ground is h, and an allowable stacking height of the sand and gravel is $h_1$, and requiring that the sand and gravel cannot bury the undercarriage during the stacking and unloading, then a distance from an unloading position of the unloading trolley (9) to the tower body shall not be less than $h_1$/tan γ. The travel switches are respectively mounted on the position of the conveying arm that is $h_1$/tan γ away from the tower body and on the tail end of the conveying arm. The bottom of the unloading trolley is provided with a position sensor. An automatic movement of the gyration apparatus and the unloading trolley is as follows: a, after the conveying arm is unfolded, and after the driving roller is started, the unloading trolley automatically runs to the position that is $h_1$/tan γ away from the tower body for unloading; b, when a position sensor mounted on the bottom of the unloading trolley detects that a distance between sand and gravel right below the unloading trolley and the unloading trolley is h–$h_1$, the unloading trolley automatically runs for 3 meters along the conveying arm in a direction away from the tower body, and then the process b is repeated until the trolley runs to the tail end of the conveying arm and touches the travel switch; c, when this happens, the trolley unloads the material again to a specific height; then the gyration apparatus automatically rotates clockwise by 15°, and the unloading trolley continues the unloading; d, when the position sensor detects that the distance between the sand and right below the unloading trolley and the unloading trolley is h–$h_1$ again, the unloading trolley (9) automatically runs for 3 meters along the conveying arm towards the tower body, and the process d is repeated until the trolley touches the travel switch again; e, when the unloading trolley (9) runs to the position that is $h_1$/tan γ away from the tower body and touches the travel switch on the position, the trolley unloads the material again to the specific height and then the gyration apparatus automatically rotates clockwise by 15°; the processes a-e are repeated until the conveyor rotates clockwise by 180°; f, after the conveyor rotates clockwise by 180° and the unloading is ended, the conveyor automatically rotates counterclockwise by 195°; g, when the position sensor mounted on the bottom of the unloading trolley detects that the distance between the sand and gravel right below the unloading trolley and the unloading trolley is h–$h_1$, the unloading trolley automatically runs for 3 meters along the conveying arm towards the tower body, and then the process is repeated until the unloading trolley touches the travel switch again; h, when the unloading trolley runs to the position that is $h_1$/tan γ away from the tower body and touches the travel switch on the position, the unloading trolley unloads the material to the specific height, and then the conveyor automatically rotates counterclockwise by 15°; i, when the position sensor detects that the distance between the sand and gravel right below the unloading trolley and the unloading trolley is h–$h_1$ again, the unloading trolley automatically runs for 3 meters along the conveying arm in a direction away from the tower body, and the process i is repeated until the trolley touches the travel switch again; j, when the trolley runs to the tail end of the conveying arm and touches the travel switch, the gyration apparatus automatically rotates counterclockwise by 15° and then the unloading trolley continues the unloading; and the processes g-j are repeated until the conveyor rotates counterclockwise by 165° and the unloading is completed; k, after the conveyor rotates counterclockwise by 165°, the conveyor automatically rotates clockwise by 165° to return to an initial position; and l, if the driving roller is stopped midway, the unloading trolley is automatically returned, and the gyration apparatus is also automatically returned.

Figure 8:
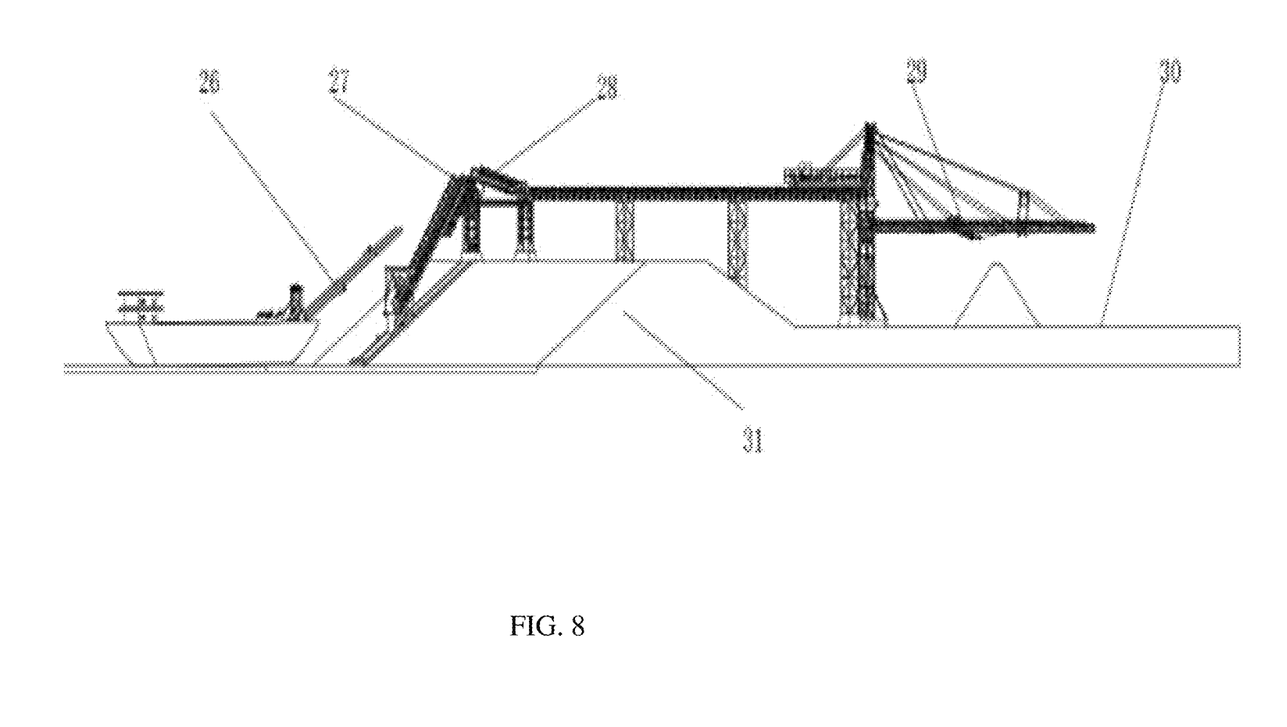

As shown in the drawings, the conveyor is mounted at the tail end of the conveying system, and the materials conveyed by the front conveyor are piled up in the stockyard.

The above describes preferred contents of the present invention, and shall not be used to limit the scope of claims of the present invention. It should be pointed out that several variations, improvements, and replacements may be made by those with ordinary skills in the art without departing from the concept of the present invention, and shall fall within the protection scope of the present invention. Therefore, the patent protection scope of the present invention shall depend on claims.

The invention claimed is:

1. A folding arm conveyor that rotates horizontally comprising: three sections of conveying arms, a tower top (10), a balance arm (17), a tower body (24), an undercarriage (25), a windlass, wire ropes, portal frames, and a limit apparatus; the undercarriage (25) is fixedly mounted in a stockyard through foundation bolts; and the tower body (24) is also connected with the undercarriage (25) by bolts;

the three sections of conveying arms are respectively a first conveying arm (7), a second conveying arm (4), and a third conveying arm (1), the first conveying arm (7) is mounted on the tower body (24) through a pin shaft, the second conveying arm (4) is connected to the first conveying arm (7) through a pin shaft, the third conveying arm (1) is connected to the second conveying arm (4) through a pin shaft, the third conveying arm (1) is a trapezoidal structure and the conveying arm is provided with an unloading trolley (9); a portal frame I (5) is mounted on one end of the first conveying arm (7) close to the second conveying arm (4), and a limit apparatus I (6) is also mounted on the first conveying arm; a portal frame II (2) is mounted on one end of the third conveying arm (1) close to the second conveying arm (4), and a limit apparatus II (3) is also mounted on the third conveying arm;

the balance arm (17) is mounted on the tower body (24) through a pin shaft; the tower top (10) is connected to the tower body (24) through bolts; the windlasses includes a windlass I (21), a windlass II (20), a windlass III (19), and a windlass IV (18), which are sequentially mounted on the balance arm (17);

a wire rope I (11) controlled by the windlass I (21) successively bypasses a pulley block on a top end of the tower top, a pulley block on a top end of the portal frame I (5), and a pulley block on a lower portion of the second conveying arm (4); a wire rope II (12) controlled by the windlass II (20) bypasses the pulley block mounted on the tower top (10) and finally bypasses a pulley block located on an upper portion of the second conveying arm (4); a wire rope III (13) controlled by the windlass III (19) successively bypasses the pulley block on the top end of the tower top (10), the pulley block on the top end of the portal frame II (2), and a pulley block on a side portion of the third conveying arm (1); and the tower body (24) is provided with a gyration apparatus (23) and a hopper (22);

distances from the pulley block on the lower portion of the second conveying arm to two ends of the second conveying arm are respectively a first distance and a second distance; the first distance is twice the second distance; and distances from the pulley block on the side portion of the third conveying arm to two ends of the third conveying arm are respectively a third distance and a fourth distance; the third distance is twice the fourth distance, and the pulley block on the upper portion of the second conveying arm and the pulley block on the lower portion of the second conveying arm are arranged side by side;

the balance arm (17) is provided with a balance trolley (16) and travel switches; the balance trolley is connected with the windlass IV through a wire rope IV, and the movement of the balance trolley is controlled by the windlass IV (18) which is automatically controlled based on PLC programming; when the conveying arms are in a folded, unfolded no-load, unfolded medium-load, and unfolded heavy-load state, the balance trolley moves to the corresponding four positions on the balance arm; the purpose for moving the trolley to different positions is to balance a tilting torque of the conveying arm in different states, a travel switch is mounted on each position, and the travel the unloading trolley (9) is provided with an inclined plate for receiving the materials dropped by the hopper (22); the inclined plate can assist in causing sand and gravel to fall into the unloading trolley (9);

the lower end of the balance arm (17) is provided with a hook for connecting with upstream equipment, and the weight of upstream equipment is used as a counterweight.

2. The folding arm conveyor that rotates horizontally according to claim 1, wherein the balance arm (17) and the conveying arm are respectively mounted on two sides of the tower body (24); the mounting position of the balance arm (17) is higher than that of the conveying arm, the balance arm (17) and the conveying arm are connected with a crossbeam located on the top end of the tower top through a balance arm pull rod (14) and a conveying arm pull rod (8), respectively.

3. The folding arm conveyor that rotates horizontally according to claim 1, wherein one end of the first conveying arm (7) close to the tower body (24) is provided with a driving roller, and the tail end of the third conveying arm (1) is respectively provided with a driven roller; the first conveying arm (7), the second conveying arm (4), and the third conveying arm (1) are each provided with a grooved carrier roller group, a return carrier roller, and a pinch roller, the pinch roller is used to prevent a conveying belt from leaving the carrier roller during the folding and unfolding of the conveying arm, the unloading trolley (9) can move along the conveying arm.

4. The folding arm conveyor that rotates horizontally according to claim 1, wherein the tower top (10) is successively provided with three pulley blocks from bottom to top, which are respectively used for the wire rope I (11), the wire rope II (12), and the wire rope III (13) to bypass.

5. The folding arm conveyor that rotates horizontally according to claim 1, wherein the tower body (24) is provided with the gyration apparatus (23), the gyration apparatus (23) can drive the conveying arm and the balance arm (17) to rotate within a horizontal plane.

6. The folding arm conveyor that rotates horizontally according to claim 1, wherein the first distance is the distance from the pulley block on the lower portion of the second conveying arm to one end of the second conveying arm close to the tower body in an unfolded state.

7. The folding arm conveyor that rotates horizontally according to claim 1, wherein the hopper (22) can incline relative to the tower body so as to be convenient to wash.

8. The folding arm conveyor that rotates horizontally according to claim 1, wherein the movements of the gyration apparatus (23) and the unloading trolley (9) are controlled by a programmable control system.

* * * * *